(12) United States Patent
Isobe et al.

(10) Patent No.: US 7,691,940 B2
(45) Date of Patent: Apr. 6, 2010

(54) AQUEOUS POLYURETHANE RESIN AND METHOD FOR PRODUCING AQUEOUS POLYURETHANE RESIN AND FILM

(75) Inventors: Masahiro Isobe, Sodegaura (JP); Fumiaki Hirata, Sodegaura (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 0 days.

(21) Appl. No.: 11/792,382

(22) PCT Filed: Dec. 8, 2005

(86) PCT No.: PCT/JP2005/022567

§ 371 (c)(1),
(2), (4) Date: Jun. 6, 2007

(87) PCT Pub. No.: WO2006/062165

PCT Pub. Date: Jun. 15, 2006

(65) Prior Publication Data

US 2008/0045650 A1    Feb. 21, 2008

(30) Foreign Application Priority Data

Dec. 10, 2004 (JP) ............................. 2004-359193

(51) Int. Cl.
C08G 18/10 (2006.01)
C08G 18/08 (2006.01)
C08L 75/04 (2006.01)

(52) U.S. Cl. .................................................. 524/589

(58) Field of Classification Search .................. 524/589
See application file for complete search history.

(56) References Cited

U.S. PATENT DOCUMENTS

| | | | |
|---|---|---|---|
| 4,582,873 A * | 4/1986 | Gaa et al. | 524/591 |
| 5,959,003 A * | 9/1999 | Lo et al. | 523/201 |
| 6,399,735 B1 | 6/2002 | Fischer et al. | |
| 2003/0032759 A1 | 2/2003 | Fischer et al. | |
| 2003/0045668 A1 | 3/2003 | Fischer et al. | |
| 2003/0105221 A1 * | 6/2003 | Christenson et al. | 524/589 |
| 2004/0198901 A1 | 10/2004 | Graham et al. | |
| 2005/0004306 A1 * | 1/2005 | Lubnin et al. | 524/589 |
| 2007/0036983 A1 | 2/2007 | Takeda et al. | |

FOREIGN PATENT DOCUMENTS

| | | |
|---|---|---|
| JP | 8-3263 A | 1/1996 |
| JP | 8-504459 A | 5/1996 |
| JP | 8-508314 A | 9/1996 |
| JP | 11-503772 A | 3/1999 |
| JP | 2001-213935 A | 8/2001 |
| JP | 2003-506538 A | 2/2003 |
| JP | 2003-82585 A | 3/2003 |
| JP | 2004-018635 A | 1/2004 |
| JP | 2004-162056 A | 6/2004 |
| JP | 2004-256800 A | 9/2004 |
| WO | WO 96/30431 A1 | 10/1996 |
| WO | WO 01/10923 A1 | 2/2001 |

* cited by examiner

*Primary Examiner*—Mark Eashoo
*Assistant Examiner*—Noah Frank
(74) *Attorney, Agent, or Firm*—Buchanan Ingersoll & Rooney PC

(57) ABSTRACT

An object of the present invention is to provide an aqueous polyurethane resin in which stable emulsion is formed, the balance between hydrophilicity and hydrophobicity is controlled and an obtained film has desired permeability and good stability, a method for producing the aqueous polyurethane resin, and a film obtained from the aqueous polyurethane resin. The aqueous polyurethane resin of the present invention includes a plurality of polyurethane resins obtained by reacting macropolyol, polyisocyanate, and a chain extender, and each of the aqueous polyurethane resins contains the macropolyols which are different from one another, and each of the aqueous polyurethane resins is chemically bonded partially to one another through the chain extender. By casting or coating the aqueous polyurethane resin, the film is obtained.

15 Claims, No Drawings

AQUEOUS POLYURETHANE RESIN AND METHOD FOR PRODUCING AQUEOUS POLYURETHANE RESIN AND FILM

FIELD OF THE INVENTION

The present invention relates to an aqueous polyurethane resin, a method for producing the aqueous polyurethane resin, and a film obtained from the aqueous polyurethane resin.

DESCRIPTION OF THE RELATED ART

Conventionally, in various applications such as a film, a polyurethane resin has been used.

Moreover, in recent years, from an aspect of an environmental load, use of organic solvents is desired to be reduced, and it is studied that the organic solvent-based polyurethane resin using an organic solvent as a solvent be replaced with an aqueous polyurethane resin using water as a dispersing solvent.

It has been known that a hydrophilic group is introduced in such an aqueous polyurethane resin to enhance its hydrophilicity and thus moisture-permeability of the obtained film is enhanced. If the amount of the hydrophilic group introduced into the aqueous polyurethane resin becomes larger, the hydrophilicity of the aqueous polyurethane resin and the moisture-permeability of the film become higher, but on the other hand, if the amount of the hydrophilic group is too large, gelification of the aqueous polyurethane resin and the like are caused and the stability becomes low or mechanical strength of the film becomes low.

On the other hand, if the hydrophilicity is lowered by introducing a hydrophobic group in the aqueous polyurethane resin, stability and mechanical strength of the film to be obtained are high but the moisture-permeability becomes low.

Accordingly, there has been investigated the aqueous polyurethane resin in which the amounts of the hydrophilic group and the hydrophobic group to be introduced are controlled and the film to be obtained is set to have desired moisture-permeability, stability, and so forth.

For example, an aqueous resin in which a hydrophilic water-soluble-polyether-based polyurethane and a hydrophobic self-emulsification-type-polyether-based polyurethane are mixed has been proposed (see, for example, the following Patent Document 1). Patent Document 1: Japanese Unexamined Patent Publication No. 2004-256800

DISCLOSURE OF THE INVENTION

Problems to be Solved by the Invention

However, because a hydrophilic polyurethane and a hydrophobic polyurethane are merely mixed for such an aqueous resin, the compatibility between the hydrophilic polyurethane and the hydrophobic polyurethane in the mixed aqueous resin is not sufficient and the aqueous resin comes to have low stability.

An object of the present invention is to provide an aqueous polyurethane resin in which a stable aqueous form is formed, the balance between hydrophilicity and hydrophobicity is controlled and an obtained film has desired moisture-permeability and good stability, a method for producing the aqueous polyurethane resin, and a film obtained from the aqueous polyurethane resin.

Solution to the Problems

To achieve the above object, an aqueous polyurethane resin of the present invention includes a plurality of polyurethane resins obtained by reacting macropolyol, polyisocyanate, and a chain extender, wherein each of the polyurethane resins contains the macropolyol which is different from one another, and each of the polyurethane resins is chemically bonded partially to one another through the chain extender.

Moreover, in the aqueous polyurethane resin of the present invention, it is preferable that at least one polyurethane resin out of the plurality of polyurethane resins contains at least one kind of hydrophobic macropolyol selected from the group consisting of polyesterpolyol, polycarbonatepolyol, and polyoxypolyalkylenepolyol whose alkylene group has 3-10 carbons, and in the plurality of polyurethane resins, the polyurethane resin which is different from the polyurethane resin containing the hydrophobic macropolyol has a hydrophilic macropolyol having 50% by weight or more of polyoxyethylene groups.

Moreover, in the aqueous polyurethane resin of the present invention, it is preferable that a chemical bond is a urea bond.

Moreover, in the aqueous polyurethane resin of the present invention, it is preferable that the chain extender contains polyamine, and the urea bond is a urea bond produced by reaction of the polyamine and the polyisocyanate.

Moreover, in the aqueous polyurethane resin of the present invention, it is preferable that the polyoxyethylene group contained in the aqueous polyurethane resin is 20% by weight or more.

Moreover, in the aqueous polyurethane resin of the present invention, it is preferable that the hydrophobic macropolyol is contained at 40% by weight or more with respect to the polyurethane resin containing the hydrophobic macropolyol, and the polyoxyethylene group in the hydrophilic macropolyol is contained at 40% by weight or more with respect to the polyurethane resin containing the hydrophilic macropolyol.

Moreover, in the aqueous polyurethane resin of the present invention, it is preferable that the chain extender contains polyamine having a polyoxyethylene group.

Moreover, in the aqueous polyurethane resin of the present invention, it is preferable that the chain extender contains an alkoxysilyl compound having a primary amino group or having a primary amino group and a secondary amino group.

Moreover, a method for producing an aqueous polyurethane resin of the present invention, comprising the steps of: reacting a first macropolyol and polyisocyanate to obtain a first urethane prepolymer, and aqueously dispersing the first urethane prepolymer; partially extending an isocyanate group at an end of the first urethane prepolymer with a first chain extender; reacting a second macropolyol and polyisocyanate to obtain a second urethane prepolymer; aqueously dispersing the second urethane prepolymer in an aqueous medium in which the extended first urethane prepolymer is aqueously dispersed; and extending, with a second chain extender, a residual isocyanate group at an end of the extended first urethane prepolymer and an isocyanate group at an end of the aqueously dispersed second urethane prepolymer.

Moreover, in the method for producing an aqueous polyurethane resin of the present invention, it is preferable that an equivalent ratio of the first chain extender for partially extending the isocyanate group at an end of the first urethane prepolymer with respect to the isocyanate group at the end of the first urethane prepolymer is 0.20 to 0.98.

Moreover, a method for producing an aqueous polyurethane resin of the present invention comprising the steps of:

reacting a first macropolyol and polyisocyanate to obtain a first urethane prepolymer, and aqueously dispersing the first urethane prepolymer; extending an isocyanate group at an end of the first urethane prepolymer with a first chain extender whose equivalent ratio with respect to the isocyanate group at the end is excessive; reacting a second macropolyol and polyisocyanate to obtain a second urethane prepolymer; aqueously dispersing the second urethane prepolymer in an aqueous medium in which the extended first urethane prepolymer is aqueously dispersed, and at the same time, the extended first urethane prepolymer and the second urethane prepolymer are extended with the first chain extender; and extending an isocyanate group at an end of the aqueously dispersed second urethane prepolymer with a second chain extender.

Moreover, in the method for producing an aqueous polyurethane resin of the present invention, it is preferable that an equivalent ratio of the excessive first chain extender with respect to the isocyanate group at the end of the first urethane prepolymer is 1.02 to 1.80.

Moreover, in the method for producing an aqueous polyurethane resin of the present invention, it is preferable that in the step of aqueously dispersing the second urethane prepolymer in the aqueous medium in which the extended first urethane prepolymer is aqueously dispersed, the first urethane prepolymer and the second urethane prepolymer does not solve into each other.

Moreover, a film of the present invention is obtained by casting or coating the above-described aqueous polyurethane resin.

Effect of the Invention

According to the method for producing an aqueous polyurethane resin of the present invention, an aqueous polyurethane resin in which stable aqueous form is formed and the balance between hydrophilicity and hydrophobicity is controlled can be produced. According to the aqueous polyurethane resin of the present invention, the film having moisture-permeability and good stability can be obtained.

Embodiments of the Invention

An aqueous polyurethane resin of the present invention includes a plurality of polyurethane resins obtained by reacting macropolyol, polyisocyanate, and a chain extender, in which each of the polyurethane resins contains the macropolyols which is different from one another, and each of the polyurethane resins is chemically bonded partially to one another through the chain extender.

The macropolyol includes, for example, a hydrophobic macropolyol or hydrophilic macropolyol.

The hydrophobic macropolyol is not particularly limited and includes, for example, polyesterpolyol, polycarbonatepolyol, and polyoxypolyalkylenepolyol whose alkylene group has 3-10 carbons.

As the polyesterpolyol includes polyesterpolyol generated by reaction of one kind or two kinds or more of multivalent alcohol(s) such as ethylene glycol, diethylene glycol, triethylene glycol, 1,2-propylene glycol, 1,3-butylene glycol, 1,5-pentane diol, 1,4-butylene glycol, 1,6-hexane diol, dipropylene glycol, triprolylene glycol, neopentyl glycol, cyclohexanediol and cyclohexanedimethanol, and a multivalent carbonic acid such as malonic acid, maleic acid, succinic acid, adipic acid, azelaic acid, tartaric acid, pimelic acid, sebacic acid, oxalic acid, terephthalic acid, isophthalic acid, maleic acid anhydride, fumaric acid, dimer acid, and trimellitic acid or a derivative therefrom, and includes polyesterpolyol generated by ring-opening polymerization of ϵ-caprolactone and such, and so forth.

The polycarbonatepolyol includes polycarbonatepolyol obtained by reacting one kind or two kinds or more of diol(s) such as ethylene glycol, propylene glycol, 1,3-propane diol, 1,4-butane diol, 1,5-pentane diol, 3-methyl-1,5-pentane diol, 1,6-hexane diol, 1,9-nonane diol, 1,8-nonane diol neopentyl glycol, diethylene glycol, dipropylene glycol, 1,4-cyclohexane diol, 1,4-cyclohexanedimethanol, and bisphenol-A, and a carbonate such as dimethyl carbonate, diphenyl carbonate, ethylene carbonate, and phosgene, and so forth.

The polyoxypolyalkylenepolyol whose alkylene group has 3-10 carbons includes a polyol in which a cyclic ether such as oxetane, tetrahydrofurane, and tetrahydropyrane is ring-opening adding polymerized by an initiator of low-molecular-weight diol such as ethylene glycol, diethylene glycol, triethylene glycol, 1,2-propylene glycol, 1,3-butylene glycol, 1,5-pentane diol, 1,4-butylene glycol, 1,6-hexane diol, dipropylene glycol, triprolylene glycol, and neopentyl glycol, and so forth. The polyoxypolyalkylenepolyol whose alkylene group has 3 to 7 carbons is preferable, and the polyoxypolyalkylenepolyol whose alkylene group has 4 to 6 carbons is more preferable.

Molecular weight of those hydrophobic macropolyol (number average molecular weight) is generally from about 300 to 10,000, and preferably from about 500 to 5,000.

The hydrophilic macropolyol is not particularly limited and include, for example, polyoxyalkylenepolyol having 50% by weight or more of polyoxyethylene groups.

Such a polyoxyalkylenepolyol includes block copolymer and random copolymer that are obtained by addition reaction of alkylene oxide containing 50% by weight or more of ethylene oxide using the low-molecular-weight polyol as the initiator.

The low-molecular-weight polyol includes low-molecular diol-weight such as ethylene glycol, propylene glycol, 1,4-butylene glycol, 1,3-butylene glycol, 1,2-butylene glycol, 1,6-hexane diol, neopentyl glycol, alkane (the number of carbons is 7 to 22) diol, diethylene glycol, triethylene glycol, dipropylene glycol, cyclohexanedimethanol, alkane-1,2-diol (the number of carbons is 17 to 20), hydrogenated bisphenol-A, 1,4-dihydroxy-2-butene, 2,6-dimethyl-1-octene-3,8-diol, bishydroxyethoxybenzene, xylene glycol, and bishydroxyethylene terephthalate, and includes low-molecular-weight triol such as glycerin, 2-methyl-2-hydroxymethyl-1,3-propane diol, 2,4-dihydroxy-3-hydroxymethyl pentane, 1,2,6-hexane triol, 1,1,1-tris(hydroxymethyl) propane, and 2,2-bis(hydroxymethyl)-3-butanol.

Alkylene oxide except for ethylene oxide includes, for example, propylene oxide, and so forth.

Such a polyoxyalkylenepolyol may be used singly, and also two kinds or more may be used together. Polyethylene glycol is preferable, and polyethylene glycol having a number average molecular weight of 500 to 3000.

The polyisocyanate is not particularly limited as long as being capable of being used generally for production of polyurethane resin, and includes, for example, aromatic diisocyanate, aromatic aliphatic diisocyanate, aliphatic diisocyanate, alicyclic diisocyanate, and derivatives and modified compounds of those diisocyanates.

The aromatic diisocyanate includes, for example, m-phenylene diisocyanate, p-phenylene diisocyanate, 4,4'-diphenyl diisocyanate, 1,5-naphthalene diisocyanate, 4,4'-diphenyl methane diisocyanate, 2,4- or 2,6-tolylene diisocyanate, 4,4'-toluidine diisocyanate, 4,4'-diphenylether diisocyanate, and so forth.

The aromatic aliphatic diisocyanate includes, for example, 1,3- or 1,4-xylylene diisocyanate or its mixture, tetramethylxylylene diisocyanate, and so forth.

The aliphatic diisocyanate includes, for example, trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanato methylcaproate, and so forth.

The alicyclic diisocyanate includes, for example, 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (isophorone diisocyanate), 4,4'-methylenebis(cyclohexyl isocyanate), methyl-2,6-cyclohexane diisocyanate, methyl-2,6-cyclohexane diisocyanate, 1,4-bis(isocyanatomethyl)cyclohexane, 1,3-bis(isocyanatomethyl)cyclohexane, 2,5(2,6)-bis(isocyanatomethyl)bicyclo[2.2.1]heptane, and so forth.

Moreover, derivatives of polyisocyanate includes, for example, dimer, trimer, biuret, allophanate, carbodiimide, uretodion, oxadiazine trion, of the above-described polyisocyanate, polymethylene polyphenyl polyisocyanate (crude MDI, polymeric MDI), clued TDI, and so forth.

Furthermore, modified compounds of polyisocyanate includes polyol-modified compounds obtained by reacting the above-described polyisocyanate or derivative of polyisocyanate and the above-described low-molecular-weight polyol at an equivalent ratio that an amount of the polyisocyanate group of the polyisocyanate is excessively more than that of the hydroxyl group of the polyol.

These polyisocyanate may be used singly, or two kinds or more are used together. Moreover, in these polyisocyanates, from an aspect of mechanical strength, alicyclic diisocyanate such as 1,3-bis(isocyanatomethyl)cyclohexane, 4,4'-methylenebis(cyclohexyl isocyanate), aromatic diisocyanate such as 4,4'-diphenylmethane diisosyanate, and so forth are preferable.

The chain extender is not particularly limited and includes, for example, an amine, an alkoxysilyl compound having a primary amino group or having a primary amino group and a secondary amino group, and polyamine such as polyamine containing polyoxyethylene group.

The amine is not particularly limited and includes, for example, diamine such as ethylenediamine, 1,3-propanediamine, 1,4-butanediamine, 1,6-hexamethylenediamine, 1,4-cyclohexane diamine, 3-isocyanatomethyl-3,5,5-trimethylcyclohexyl isocyanate (isophoronediamine), 4,4'-dicyclohexylmethanediamine, 2,5(2,6)-bis(aminomethyl)bicyclo[2.2.1]heptane, 1,3-bis(amino methyl)cyclohexane and hydrazine, polyamine such as diethylenetriamine, triethylenetetramine and tetraethylenepentamine, and aminoalcohol such as N-(2-aminoethyl)ethanolamine. These amines may be used singly, and also two kinds or more may be used.

The alkoxysilyl compound having a primary amino group or having a primary amino group and a secondary amino group is not limited, and specifically includes monoamine having alkoxy silyl group such as γ-aminopropyltriethoxysilane and N-phenyl-γ-aminopropyltrimethoxysilane, N-β(aminoethyl)γ-aminopropyltrimethoxysilane, N-β(aminoethyl)γ-aminopropylmethyldimethoxysilane, and so forth.

The polyamine having a polyoxyethylene group includes, for example, polyoxyethylene ether diamine represented by the following structural formula (1), polyoxyalkylene ether diamine represented by the following structural formula (2), polyoxyethylene ether diamine represented by the following structural formula (3), and polyamine represented by the following structural formula (4). The number average molecular weight of the polyamine having a polyoxyethylene group is, for example, in the range of 100 to 20,000, and preferably, in the range of 140 to 10,000. Specifically, for example, PEG#1, 000 diamine (corresponding to the structural formula (1)) by NOF CORPORATION. JEFFERMIN ED-2003 (corresponding to the structural formula (2)), EDR-148 (corresponding to the structural formula (3)), XTJ-512 (corresponding to the structural formula (4)) by Huntsman Inc., and so forth are included.

[Chemical Formula 1]

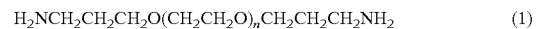

(1)

In the formula, n represents polymerization degree.

[Chemical Formula 2]

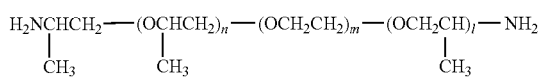

(2)

In the formula, n, m, and l represent polymerization degree.

[Chemical Formula 3]

$$H_2N(CH_2CH_2O)_nCH_2CH_2NH_2 \quad (3)$$

In the formula, n represents polymerization degree.

[Chemical Formula 4]

$$H_2N[(CH_2CH_2O)_nCH_2CH_2NH]_mH \quad (4)$$

In the formula, n and m represent polymerization degree.

Moreover, in the case of preparing each of the polyurethane resins as self-emulsification type, a compound having an active hydrogen group having an anionic group is reacted therewith.

The compound having an active hydrogen group having an anionic group is not particularly limited and includes, for example, a compound having one anionic group and two or more active hydrogen groups. More specifically, the compound having an active hydrogen group having a carboxyl group includes, dihydroxy carbonic acid such as 2,2-dimethylol acetic acid, 2,2-dimethylol lactic acid, 2,2-dimethylol propanic acid, 2,2--dimethylol butanoic acid, 2,2-dimethylol valeric acid, and diamino carbonic acid such as lysine and arginine.

These compounds having an active hydrogen group having an anionic group may be used singly and two kinds or more may be used together. Moreover, in these compounds having an active hydrogen group having an anionic group, the compound having an active hydrogen group having a carboxyl group is preferable.

In the aqueous polyurethane resin of the present invention, a plurality of the above-described polyurethane resins are contained. For example, two kinds or three kinds or more polyurethane resins are contained. That is, the aqueous polyurethane resin of the present invention contains a plurality of polyurethane resins having macropolyol which are different from one another.

Specifically, an aqueous polyurethane resin of the present invention includes, for example, a hydrophobic polyurethane resin obtained by reaction of a hydrophobic macropolyol as a first macropolyol, the above-described polyisocyanate and the above-described chain extender, and a hydrophilic polyurethane resin obtained by reaction of a hydrophilic macropolyol as a second macropolyol, the above-described polyisocyanate and the above-described chain extender.

The above-described respective polyurethane resins (the hydrophobic polyurethane resin and the hydrophilic polyurethane resin) are chemically bonded partially to each other through the chain extender.

The partial chemical bond is a chemical bond by reaction of the polyamine of the above-described chain extender and polyisocyanate of each of the aqueous polyurethane resin, and specifically, an urea bond by reaction of the amino group of the polyamine and the isocyanate group of each of the aqueous polyurethane resins.

Next, the method for producing an aqueous polyurethane resin of the present invention is explained with reference to a first method for producing an aqueous polyurethane resin in which the hydrophobic polyurethane resin and the hydrophilic polyurethane resin are chemically bonded partially to each other through an chain extender.

In this method, first, the hydrophobic macropolyol and the above-described polyisocyanate are reacted and thereby, the hydrophobic urethane prepolymer is obtained.

For obtaining the hydrophobic urethane prepolymer, for example, the hydrophobic macropolyol, the above-described polyisocyanate, and if necessary (in the case of self-emulsification), the above-described compound having an active hydrogen group having an anionic group are mixed so that an equivalent ratio (NCO/active hydrogen group) of the isocyanate group with respect to the active hydrogen group becomes a value of more than 1, preferably from 1.02 to 20, and more preferably from 1.1 to 4. Then, they are reacted by, for example, a known reacting (polymerizing) method such as bulk polymerization or solution polymerization.

Moreover, in this reaction, preferably, the above-described components are mixed so that the hydrophobic macropolyol is contained at 40% by weight or more, further, 50% by weight or more, with respect to the hydrophobic polyurethane resin (solid content).

In the bulk polymerization, for example, under an nitrogen flow, polyisocyanate is stirred, and the hydrophobic macropolyol and, if necessary, the compound having an active hydrogen group having an anionic group are added thereto, and reacted at a reaction temperature of 75 to 85° C. for 1 to 10 hours.

In the solution polymerization, for example, under a nitrogen flow, polyisocyanate is stirred in a reaction solvent and, if necessary, the hydrophobic macropolyol and the compound having an active hydrogen group having an anionic group are added thereto and, reacted at a reaction temperature of a boiling point of the reaction solvent or less for about 1 to 10 hours.

As the reaction solvent, a low boiling point solvent that is inactive against the active hydrogen group and the isocyanate group and that is easy to be removed. Such a reaction solvent includes, for example, acetone, methyl ethyl ketone, ethyl acetate, tetrahydrofurane, acetonitrile, and so forth.

Moreover, in this reaction, a reaction catalyst can be used according to need, and also, unreacted monomers of the polyisocyanate can be removed from the system of reaction by using, for example, a known means such as distillation or extraction.

The reaction catalyst includes a tin-based catalyst and an amine-based catalyst.

Next, in this method, the obtained hydrophobic urethane prepolymer is aqueously dispersed.

For aqueously dispersing the hydrophobic urethane prepolymer, for example, the hydrophobic urethane prepolymer is added in water of about 0.5 to 30 wt times, and stirred and aqueously dispersed. In the stirring, if an mixer such as homomixer is used, high shear is provided, and therefore, the hydrophobic urethane prepolymer easily becomes an aqueously dispersion.

Moreover, in this reaction, in the case of performing self-emulsification, the pH is adjust by using a neutralizing agent.

As the neutralizing method, it is preferable that a neutralizing agent selected from amines such as trimethylamine, triethylamine, tri-n-propylamine, tributylamine, and triethanolamine, inorganic alkali salts such as potassium hydroxide and sodium hydroxide, ammonia, and so forth is added thereto to form a salt of anionic groups. The addition amount of the neutralizing agent is 0.4 to 1.2 equal amounts, preferably 0.6 to 1.0 equal amounts, per one equal amount of the anionic group. Moreover, in the case of performing the later-described chain extension reaction after aqueously dispersing the hydrophobic urethane prepolymer, preferably in order to improve stability of the hydrophobic urethane prepolymer in the water, a salt of anionic group is formed before the aqueous dispersion.

Moreover, in this reaction, in the case of performing external emulsification, an emulsifier is added thereto and the obtained hydrophobic urethane prepolymer is aqueously dispersed. The emulsifier includes a known surfactant, for example, an anionic surfactant such as metal salt of alkyl sulfate and metal salt of linear alkylbenzene sulfonate, nonionic surfactant such as polyoxyalkylene alkyl phenyl ether, cationic surfactant, and so forth.

Next, in this method, the isocyanate at an end of the hydrophobic polyurethane prepolymer is chain-extended partially with the chain extender (first chain extender).

For partially chain-extending the isocyanate group at an end of the hydrophobic urethane prepolymer, preferably a hydrophobic chain extender such as diamine (such as isophoronediamine) in the above-described chain extender is used.

For performing the partial chain-extension with the chain extender, for example, first, while the hydrophobic urethane prepolymer that is aqueously dispersed is stirred, the chain extender is dropped and mixed, and then stirring and mixture are performed, for example, for 0.1 to 30 min. If the time of the stirring and the mixture is more than 30 min, there is a fear that the reaction between the residual isocyanate at the end of the polyurethane prepolymer and water is promoted, and accordingly, the amount of the isocyanate group required for being chemically bonded to the following isocyanate at the end of the hydrophilic urethane prepolymer comes to decrease.

The mixing ratio of the chain extender (first chain extender) is set so that the equivalent ratio of the amino group of the chain extender with respect to the isocyanate group at the end of the hydrophobic urethane prepolymer (amino group/isocyanate group) is less than 1, preferably from 0.20 to 0.98, and more preferably from 0.5 to 0.9. According to the above-described mixing ratio, the entire of the isocyanate group at the end of the hydrophobic urethane prepolymer is not chain-extended but a part thereof can be chain-extended. The residual isocyanate group at the end can be chemically bonded partially to the hydrophilic urethane prepolymer through the later-described next chain extender (second chain extender).

In the above description, the hydrophobic urethane prepolymer is aqueously dispersed, and then the chain extender (first chain extender) is mixed. However, conversely, first, the chain extender (first chain extender) is preliminarily mixed in the water, and the aqueously dispersed solution (aqueous solution) of the chain extender (first chain extender) is prepared, and then therein hydrophobic urethane prepolymer can be mixed and dispersed.

By the above-described partial chain-extension, the hydrophobic polyurethane resin containing the hydrophobic macropolyol can be obtained.

Then, according to this method, separately, by reacting the hydrophilic macropolyol and the above-described polyisocyanate, the hydrophilic urethane prepolymer is obtained.

For obtaining the hydrophilic urethane prepolymer, for example, the hydrophilic macropolyol, the above-described polyisocyanate, and if necessary (in the case of self-emulsification), the compound having an active hydrogen group having an anionic group are mixed such that the equivalent ratio (NCO/active hydrogen group) of the isocyanate group with respect to the active hydrogen group becomes a value of more than 1, preferably 1.02 to 20, and more preferably 1.1 to 4, and then reacted by a known reaction (polymerization) method such as bulk polymerization or solution polymerization.

Polyisocyanate for obtaining the hydrophobic urethane prepolymer and polyisocyanate for obtaining the hydrophilic urethane prepolymer may be the same kind of polyisocyanate, or may be the different kinds of polyisocyanates.

Moreover, in this reaction, preferably, the above-described components are mixed so that the polyoxyethylene group of the hydrophilic macropolyol is contained at 40% by weight or more, further, 50% by weight or more, with respect to the hydrophilic polyurethane resin (solid content).

Furthermore, the above-described components are mixed so that the polyoxyethylene group in the aqueous polyurethane resin is contained at 20% by weight or more, preferably 30% by weight or more, in the aqueous polyurethane resin (with respect to the solid content of the aqueous polyurethane resin).

In the bulk polymerization or the solution polymerization, according to the same method and condition as the above descriptions, the reaction can be performed.

Next, in this method, the hydrophilic urethane prepolymer is mixed in the extended hydrophobic urethane prepolymer, namely, the hydrophobic polyurethane resin partially chain-extended as described above and having the isocyanate group at the end (aqueous solvent in which the hydrophobic polyurethane resin is aqueously dispersed), and thereby the aqueous dispersion is performed.

Moreover, the mixing ratio of the hydrophobic polyurethane resin and the hydrophilic urethane prepolymer is appropriately selected considering the balance between hydrophobicity and hydrophilicity according to the purpose and the application. For example, the hydrophilic urethane prepolymer is from 10 to 2,000 parts by weight, preferably from 30 to 1,000 parts by weight, based on 100 parts by weight of the hydrophobic polyurethane resin.

In the mixture, the hydrophobic polyurethane resin and the hydrophilic urethane prepolymer do not solve into each other, and they are separated into independent blocks, and the aqueous dispersion is performed.

Next, in this method, after the aqueous dispersion, the isocyanate group at the end of the hydrophilic urethane prepolymer is chain-extended with a chain extender (second chain extender), and the residual isocyanate group at the end of the hydrophobic polyurethane resin and the isocyanate group at the end of the hydrophilic urethane prepolymer are chemically bonded to each other through the chain extender (second chain extender).

For chain-extending the isocyanate group at the end of the hydrophilic urethane prepolymer and chemically bonding the residual isocyanate group at the end of the hydrophobic polyurethane resin and the isocyanate group at the end of the hydrophobic urethane to each other, in the above-described chain extender, preferably, there is used an hydrophilic chain extender such as an alkoxysilyl compound having a primary amino group or having a primary amino group and a secondary amino group (such as N-β(aminoethyl)γ-aminopropylmethyldimetoxysilane), and polyamine having a polyoxyethylene group (such as EDR-148, PEG#1000 diamine).

In addition, for example, the chain extender (the first chain extender) for partially chain-extending the isocyanate group at the end of the hydrophobic urethane prepolymer and the chain extender (the second chain extender) for chain-extending the polyisocyanate group at the end of the hydrophilic urethane prepolymer and then chemically bonding the residual isocyanate group at the end of the hydrophobic polyurethane resin and the isocyanate group at the end of the hydrophilic urethane prepolymer to each other may be the same kind of chain extender or may be the different kinds of chain extender.

The chain extension is performed by mixing the chain extender in an aqueously dispersed solution in which the hydrophobic polyurethane resin and the hydrophilic urethane prepolymer are mixed and aqueously dispersed.

Specifically, while the above-described aqueously dispersed solution is stirred, the chain extender is dropped and blended, and then the stirring and the mixture is performed for 1 to 5 hours.

The mixing ratio of the chain extender (the second chain extender) is set, for example, so that the equivalent ratio (amino group/isocyanate group) of the amino group of the chain extender with respect to the total sum of the residual isocyanate group at the end of the hydrophobic polyurethane resin and the isocyanate group at the end of the hydrophilic urethane prepolymer is 0.4 to 1.2, preferably 0.8 to 1.0.

Accordingly, the isocyanate group at the end of the hydrophilic urethane prepolymer is reacted with the chain extender and thereby the hydrophilic urethane resin is obtained, and at the same time, in the aqueously dispersed solution, the obtained hydrophilic urethane resin and the obtained hydrophobic polyurethane resin are aqueously dispersed so as to be independent blocks respectively, and they are chemically bonded partially to each other through the chain extender, and thereby the aqueous polyurethane resin of the present invention can be obtained.

In this case, when the isocyanate group at the end of the hydrophobic urethane prepolymer is chain-extended with the hydrophobic chain extender and then the isocyanate group at the end of the hydrophilic urethane prepolymer is chain-extended with the hydrophilic chain extender as described above, the balance of the hydrophobicity and the hydrophobicity can be controlled.

Moreover, in this case, because in addition to the above-described chain extension, the residual isocyanate group at the end of the hydrophobic polyurethane resin and the isocyanate group at the end of the hydrophilic urethane prepolymer are chemically bonded to each other through the chain extender, the stability of the aqueous polyurethane resin can be enhanced.

Furthermore, in this case, in the case of partially chain-extending the isocyanate group at the end of the hydrophobic urethane prepolymer with a diamine, such a diamine is generally marketed, and is easy to be industrially obtained and has various kinds with compared to the polyamine having a primary amino group and a secondary amino group in the one molecular that is suitably used in the later-described second producing method, and therefore, can be used for designing various aqueous polyurethane resins and industrially producing them.

Moreover, when the above-described diamine is used, the polyamine having a primary amino group and a secondary amino group in the one molecular such as N-(2-aminoethyl) ethanolamine that is specifically exemplified in the second producing method is not required to be used. Therefore, by the amount of the polyamine having a primary amino group and a secondary amino group in the one molecule that is not used, the polyamine (hydrophilic polyamine) such as polyamine having a polyoxyethylene group can be increased. Therefore, control width of the hydrophilicity of the aqueous polyurethane resin to be obtained can be larger.

The organic solvent and water are partially removed by, for example, reduced-pressure drying or the like so that the obtained aqueous polyurethane resin comes to have a desired solid content and so that the contained organic solvent can be distilled away. Alternatively, water is further added thereto so that the resin comes to have a desired solid content.

In the above description, first, the hydrophobic urethane prepolymer is prepared and aqueously dispersed, and then the first chain extender is mixed thereto and the isocyanate group at the end of the hydrophobic urethane prepolymer is partially chain-extended, and then the hydrophilic urethane prepolymer is mixed therein and aqueously dispersed and the second chain extender is mixed thereto, and thereby the isocyanate group at the end of the hydrophilic urethane prepolymer is chain-extended, and at the same time, the residual isocyanate group at the end of the hydrophobic polyurethane resin and the isocyanate group at the end of the hydrophilic urethane prepolymer are chemically bonded to each other. However, conversely, it is possible that first, the hydrophilic urethane prepolymer is prepared and aqueously dispersed, and next the first chain extender is mixed thereto, the isocyanate group at the end of the hydrophilic urethane prepolymer is partially chain-extended, and then the hydrophobic urethane prepolymer is mixed therein and aqueously dispersed, and the second chain extender is mixed thereto and thereby the isocyanate group at the end of the hydrophobic polyurethane resin is chain-extended, and at the same time, the residual isocyanate group at the end of the hydrophilic polyurethane resin and the isocyanate group at the end of the hydrophobic urethane prepolymer are chemically bonded to each other.

Moreover, in the aqueous polyurethane resin obtained by the first producing method of the present invention, according to the purpose and the application, there can be appropriately mixed various additives such as plasticizer, antifoamer, leveling agent, antifungal agent, anticorrosives, delustrant, fire retardant, thixotropic agent, adhesion providing agent, thickener, lubricant, antistatic agent, surfactant, reaction retardant, antioxidant, ultraviolet absorber, anti-hydrolysis agent, weathering stabilizer, colorant, inorganic pigment, organic pigment, extender pigment, curing agent, anti-tack agent, and so forth.

The mixing ratios of these various additives are appropriately selected according to the purpose and the application.

Next, the method for producing an aqueous polyurethane resin of the present invention will be explained with reference to a second method for producing an aqueous polyurethane resin in which the hydrophobic polyurethane resin and the hydrophilic polyurethane resin are chemically bonded partially to each other through a chain extender.

In this method, first, the hydrophobic macropolyol and the above-described polyisocyanate are reacted, and thereby the hydrophobic urethane prepolymer is obtained in the same manner as the above-described first producing method.

Next, in this method, the obtained hydrophobic urethane prepolymer is aqueously dispersed in the same manner as the above-described first producing method.

Next, in this method, the isocyanate group at the end of the hydrophobic urethane prepolymer is chain-extended with the chain extender (the first chain extender) whose equivalent ratio with respect to the isocyanate group at the end thereof is excessive.

For chain-extending the isocyanate group at the end of the hydrophobic urethane prepolymer with the excessive chain extender, in the above-described chain extenders, preferably, a hydrophobic chain extender such as a diamine (such as isophoronediamine) is used. Moreover, preferably, polyamines each having a primary amino group and a secondary amino group in the one molecule are used singly or used together. In this case, such a polyamine having a primary amino group and a secondary amino group in the one molecule includes, for example, a polyamine such as diethylenetriamine and triethylenetetraamine, and an amino alcohol such as N-(2-aminoethyl)ethanol amine and further preferably an amino alcohol such as N-(2-aminoethyl)ethanol amine.

For performing the chain extension with the excessive chain extender (the first chain extender), for example, first, while the hydrophobic urethane prepolymer that is dispersed in water is stirred, the excessive chain extender is dropped and mixed, and then the stirring and the mixture are performed, for example, for 0.1 minute to 2 hours. Preferably, the chain extender is quickly dropped. In particular, in the above-described chain extender, in the case of using together the diamine and the polyamine having a primary amino group and a secondary amino group in the one molecule, preferably, after dropping the diamine, the polyamine having a primary amino group and a secondary amino group in the one molecule is dropped.

The mixing radio of the chain extender (the first chain extender) is set, for example, so that the equivalent ratio (amino group/isocyanate group) of the amino group of the chain extender with respect to the isocyanate group at the end of the hydrophobic urethane prepolymer is more than 1, preferably from 1.02 to 1.80, and more preferably from 1.1 to 1.5. Moreover, in the equivalent ratio of the amino group of the chain extender (the first chain extender) with respect to the isocyanate group at the end of the hydrophobic urethane prepolymer, preferably, the blending is performed so that the primary amino group has a portion corresponding to 1.0 or less and the second primary amino group has the other portion. More specifically, the mixing is performed, for example, so that the portion of the primary amino group is from 0.1 to 0.98 and the portion of the secondary amino group is from 0.1 to 1.5, preferably, so that the primary amino group is from 0.3 to 0.8 and the portion of the secondary amino group is from 0.4 to 1.0. Moreover, in the above-described chain extender, in the case of using the polyamine having a primary amino group and a secondary amino group in the one molecule, the polyamine having a primary amino group and a secondary amino group in the one molecule with respect to the total amount of the above-described chain extender is, for example, from 5 to 90 mol %, and preferably from 10 to 80 mol %.

According to the above-described blending ratio, all of the isocyanate groups at the ends of the hydrophobic urethane prepolymer can be chain-extended. Moreover, in the chain extender that is chain-extended, the amino group that is reacted with the isocyanate group at the end of the hydrophobic urethane prepolymer and the unreacted amino group that is not reacted with the isocyanate group at the end of the hydrophobic urethane prepolymer are mixed in the one molecule. Therefore, the hydrophobic polyurethane resin comes to have an amino group at the end (unreacted amino group) by the chain extender (the first chain extender). The amino group at the end of the hydrophobic polyurethane resin is reacted with the isocyanate group at the end of the hydrophilic polyurethane prepolymer, and thereby the hydrophobic polyurethane resin and the hydrophilic polyurethane resin can be chemically bonded partially. In this case, the amino group that is not reacted with the isocyanate group at the end of the hydrophobic urethane prepolymer is mainly a secondary amino group having a rate of reaction with an isocyanate group lower than that of a primary amino group.

In the above description, first, the hydrophobic urethane prepolymer is aqueously dispersed and then the excessive chain extender (the first chain extender) is blended. However, conversely, it is also possible that the excessive chain extender (the first chain extender) is preliminarily blended in water and the aqueously dispersed solution (aqueous solution) of the excessive chain extender is prepared, and then the hydrophobic polyurethane prepolymer is blended thereto and dispersed.

Then, in this method, separately, the hydrophilic macropolyol and the above-described polyisocyanate are reacted, and thereby the hydrophilic urethane prepolymer is obtained in the same manner as the above-described first producing method.

Next, in this method, in the extended hydrophobic urethane prepolymer, namely, in the hydrophobic polyurethane resin (aqueous solvent in which the hydrophobic polyurethane resin is aqueously dispersed) that is chain-extended with the excessive chain extender (the first chain extender) and that has an amino group at the end, the hydrophilic urethane prepolymer is mixed, and thereby the aqueous dispersion is performed.

At this time, the amino group at the end of the hydrophobic polyurethane resin and a part of the isocyanate group at the end of the hydrophilic urethane prepolymer are reacted, namely, the first urethane prepolymer and the second urethane prepolymer are chain-reacted with the first chain extender, and are chemically bonded partially to each other.

The mixing ratio of the hydrophobic polyurethane resin and the hydrophilic urethane prepolymer is appropriately selected in view of the balance of the hydrophobicity and the hydrophilicity according to the purpose and the application. For example, the hydrophilic urethane prepolymer is 10 to 2,000 parts by weight, preferably 30 to 1,000 parts by weight, with respect to 100 parts by weight of the hydrophobic polyurethane resin.

At mixing, the hydrophilic polyurethane resin and the hydrophilic urethane prepolymer do not solve into each other and are separated to independent blocks and aqueously dispersed.

Next, in this method, after the aqueous dispersion, the residual isocyanate group at the end of the hydrophilic urethane prepolymer is chain-extended with a chain extender (a second chain extender).

As the chain extender (the second chain extender) for chain-extending the isocyanate group at the end of the hydrophilic urethane prepolymer, in the above-described chain extenders, preferably, there is used a hydrophilic chain extender such as an alkoxysilyl compound having a primary amino group or having a primary amino group and a secondary amino group (for example, N-β(aminoethyl)γ-aminopropylmethyldimethoxysilane), and polyamine having a polyoxyethylene group (for example, EDR-148 (corresponding to the above-described structural formula (3), manufactured by Huntsman Inc.) and PEG#1000 diamine (corresponding to the above-described structural formula (1), manufactured by NOF CORPORATION.)).

The chain extension is performed by blending the chain extender in the aqueously dispersed solution in which the hydrophobic polyurethane resin and the hydrophilic urethane prepolymer are mixed and aqueously dispersed.

Specifically, while stirring the above-described aqueously dispersed solution, the chain extender is dropped and mixed thereto, and then the stirring and the mixture are performed for 1 to 5 hours. In the case of using the polyamine having a primary amino group and a secondary amino group in the one molecule, preferably, heating to 40 to 60° C. is performed in the stirring and the mixture because a secondary amino group has lower reactivity than that of a primary amino group.

The mixing ratio of the chain extender (the second chain extender) is set, for example, so that the equivalent ratio (amino group/isocyanate group) of the amino group of the chain extender with respect to the isocyanate group at the end of the hydrophilic urethane prepolymer is from 0.4 to 1.2, and preferably from 0.8 to 1.0.

Accordingly, the residual isocyanate group at the end of the hydrophilic urethane prepolymer is reacted with the chain extender (the second chain extender) and thereby the hydrophilic urethane resin is obtained, and therewith, in the aqueously dispersed solution, the obtained hydrophilic urethane resin and the obtained hydrophobic polyurethane resin are aqueously dispersed to be independent blocks respectively, and they are chemically bonded partially to each other through the chain extender (the first chain extender), and thereby the aqueous polyurethane resin of the present invention can be obtained.

In this case, when the isocyanate group at the end of the hydrophobic urethane resin is chain-extended with the hydrophobic chain extender and then the isocyanate group at the end of the hydrophilic urethane prepolymer is chain-extended with the hydrophilic chain extender as described above, the balance of the hydrophobicity and the hydrophobicity can be controlled.

Moreover, in this case, because in addition to the above-described aqueous dispersion, the isocyanate group at the end of the hydrophobic polyurethane resin and the isocyanate group at the end of the hydrophilic urethane prepolymer are chemically bonded partially to each other, the stability of the aqueous polyurethane resin can be enhanced.

Furthermore, in this case, because the isocyanate group at the end of the hydrophobic urethane prepolymer is chain-extended with the chain extender to be an excessive amount, all of the isocyanate groups at the ends of the hydrophobic urethane prepolymer can be chain-extended. Therefore, by the second producing method, after the chain extension, the isocyanate group of the hydrophobic urethane prepolymer does not remain in such a manner as in the first producing method, and therefore, improvement of stability of the chain-extended hydrophobic polyurethane resin can be achieved. As a result, even in the way of production of the aqueous polyurethane resin, the chain-extended hydrophobic polyurethane resin can be left as it is in the reaction container and the production can be once stopped, and thereby the industrial handling property and treating property can be enhanced and at the same time the aqueous polyurethane resin can be produced.

The organic solvent and water are partially removed by, for example, reduced-pressure drying or the like, so that the obtained aqueous polyurethane resin comes to have a desired solid content and so that the contained organic solvent can be distilled away. Alternatively, water is further added thereto so that the resin comes to have a desired solid content.

In the above description, first, the hydrophobic urethane prepolymer is prepared and aqueously dispersed, and then the excessive chain extender (the first chain extender) is mixed thereto and the isocyanate group at the end of the hydrophobic urethane prepolymer are chain-extended, and then the hydrophilic urethane prepolymer is mixed therein and the hydrophobic urethane prepolymer and the hydrophilic urethane prepolymer are extended with the chain extender (the first chain extender) and chemically bonded to each other and aqueously dispersed, and next the chain extender (the second chain extender) is mixed thereto and thereby the residual isocyanate group at the end of the hydrophilic urethane prepolymer are chain-extended. However, conversely, it is possible that first, the hydrophilic urethane prepolymer is prepared and aqueously dispersed, and next the excessive chain extender (the first chain extender) is mixed thereto, the isocyanate group at the end of the hydrophilic urethane prepolymer is chain-extended and, then the hydrophobic urethane prepolymer is mixed therein and thereby the hydrophilic urethane prepolymer and the hydrophobic urethane prepolymer are extended with the chain extender (the first chain extender) and chemically bonded to each other and aqueously dispersed, and next the chain extender (the second chain extender) is mixed and thereby the residual isocyanate group at the end of the hydrophobic urethane prepolymer is chain-extended.

Moreover, to the aqueous polyurethane resin obtained according to the second producing method of the present invention, the same additive as in the first producing method can be appropriately mixed.

Then, the film of the present invention can be obtained by casting or coating the aqueous polyurethane resin of the present invention that is obtained as described above.

For casting or coating of the aqueous polyurethane resin, a known casting method or a known coating method is used. Specifically, a laminating method, a direct coating method or the like is used and selected according to the purpose and the application.

In the laminating method, for example, the aqueous polyurethane resin is applied to a surface of an exfoliate paper and the like and heat-treated, and then the exfoliate paper is laminated to a foundation cloth and heat-fused thereto.

The foundation cloth includes, for example, fabric, knit and unwoven cloth which are made of fibers such as polyester, nylon, and cotton.

Then, by such casting, on a surface of the foundation cloth, a coat composed of a capsule having moisture-permeable and water-proof property and made of the aqueous polyurethane resin, and when the film composed of the coat is used, the film having moisture-permeable and water-proof property can be obtained.

Moreover, by the direct coating method, for example, onto the foundation cloth or the exfoliate paper, direct application is performed by using, for example, a knife coater and so forth.

Then, by such coating, a surface of the foundation cloth is coated with a capsule having moisture-permeable and water-proof property and made of the aqueous polyurethane resin, and thereby the surface of the foundation cloth is processed to be moisture-permeable and water-proof.

The moisture-permeable and water-proof property is the capability that the capsule prevents rain and the other water from passing therethrough but allows moisture (vapor) to pass therethrough. For example, in the apparel application, the capability is of discharging, out of the cloth, the vapor due to sweating from a body and of preventing rain from entering the cloth. As the capsule having moisture-permeable and water-proof property, there are a fine porous capsule and a nonporous capsule. However, any one of them is possible.

In the above-described aqueous polyurethane resin, it is preferable that, for example, as a mechanical strength of the film in which the hydrophobic urethane prepolymer is cured with a curing agent (for example, a width of 10 mm and a thickness of 0.1 mm) after casting or coating the hydrophobic urethane prepolymer, the tensile strength is, for example, 3 Mpa or more, preferably 4 Mpa or more, more preferably 6 Mpa or more, and the extension percentage is, for example, 200% or more, preferably 300% or more, more preferably 400% or more, and as the hydrophilicity, the water swelling percentage is, for example, 30% or less, preferably 26% or less, and more preferably 22% or less.

Moreover, as the moisture-permeability of the film of the present invention, it is preferable in the cast capsule having a thickness of 0.02 mm, the moisture-permeable capability in the test A-1 method (according to JIS L1099) is, for example, 3,000 ($g/m^2 \cdot 24$ hours) or more, preferably 4,000 ($g/m^2 \cdot 24$ hours) or more, and more preferably 5,000 ($g/m^2 \cdot 24$ hours) or more.

The aqueous polyurethane resin of the preset invention is not limited to the film application or the processing application as the moisture-permeable and water-proof raw material for clothing as described above, and, for example, can be used for various applications such as automobile, electronics, building material, and artificial leather.

EXAMPLES

Hereinafter, the present invention will be described more specifically with reference to Examples, Comparative Examples, and Synthesis Examples. However, they do not limit the scope of the present invention at all.

Synthesis Example 1

Preparation of Hydrophobic Urethane Prepolymer

In a four-mouth flask having a reflux condensing tube, a nitrogen-inlet tube, a thermometer, and an stirrer, 183 g of 4,4'-methylene bis(cyclohexyl isocyanate) (trade name: Desmodule W, manufactured by Bayer Inc.), 500 g of the 2,000 number average molecular weight of polyoxytetramethylene glycol (trade name: PTG-2000SN, manufactured by Hodogaya Chemical Co., Ltd.), 33.5 g of dimethylolpropionic acid (trade name: Nikkama PA, manufactured by Nippon Kasei Chemical Co., Ltd.), and 318 g of acetonitrile were put, and then the reaction solution temperature was controlled to be 75 to 78° C. under a nitrogen atmosphere, and then a slight amount of stannous octoate (trade name: Stanoct, manufactured by API corporation) was added thereto as the reaction catalyst, and the reaction was performed in 5 hours until the reaction rate became 99% or more. Next, this was cooled to 40° C. and 23 g of triethylamine was added thereto, and then sufficient stirring and neutralization were performed, and thereby the hydrophobic urethane prepolymer having an isocyanate group at the molecular end was obtained.

Synthesis Examples 2 to 4

Preparation of Hydrophobic Urethane Prepolymer

Based on the following mixing formulation of Table 1, the hydrophobic urethane prepolymer was obtained by the same method as in Synthesis Example 1. In Synthesis Example 3, the reaction solution temperature was controlled to be 53 to 55° C. when, the reaction was performed.

TABLE 1

| Formulation (Hydrophobic Urethane Prepolymer) | | Synthesis Example 1 | Synthesis Example 2 | Synthesis Example 3 | Synthesis Example 4 |
|---|---|---|---|---|---|
| Polyisocyanate | H12MDI | 183 | 183 | — | 183 |
| | H6XDI | — | — | 136 | — |
| Hydrophobic Macropolyol | PTG-1 | 500 | — | — | — |
| | PC-1 | — | 500 | 500 | — |
| | Ester-1 | — | — | — | 500 |
| Internal Emulsifier | DMPA | 33.5 | 33.5 | — | 33.5 |
| | DMBA | — | — | 37 | — |
| Reaction Solvent | Acetonitrile | 318 | 318 | — | 318 |
| | Acetone | — | — | 298 | — |
| Neutralizing Agent | TEA | 23 | 23 | 23 | 23 |
| Content of Polyoxyethylene Group (% by weight) | | 0 | 0 | 0 | 0 |

The abbreviations and the product names in Table 1 are as follows. Moreover, the formulation in Table 1 is shown by g (gram).

H12MDI: 4,4'-methylene bis(cyclohexyl isocyanate), Desmodule W(trade name), manufactured by Bayer Inc.

H6XDI: 1,3-bis(isocyanatomethyl)cyclohexane, Takenate 600 (trade name), manufactured by MITSUI TAKEDA CHEMICALS, Inc.

PTG-1: 2,000 number average molecular weight of polyoxytetramethylene glycol, PTG-2000SN (trade name), manufactured by Hodogaya Chemical Co., Ltd.

PC-1: 2,000 number average molecular weight of polycarbonate polyol, UH-200 (trade name), manufactured by UBE INDUSTRIES. Ltd.

Ester-1: 2,000 number average molecular weight of polyester polyol, Takelac U-5620 (trade name), manufactured by MITSUI TAKEDA CHEMICALS, Inc.

DMPA: dimethylolpropionic acid, Nikkama PA (trade name), manufactured by Nippon Kasei Chemical Co., Ltd.

DMBA: dimethylolbutanic acid, Nikkama BA (trade name), manufactured by Nippon Kasei Chemical Co., Ltd.

TEA: triethylamine

Synthesis Example 5

Preparation of Hydrophilic Urethane Prepolymer

In a four-mouth flask having a reflux condensing tube, a nitrogen-inlet tube, a thermometer, and a stirrer, 170 g of 4,4'-methylene bis(cyclohexyl isocyanate) (trade name: Desmodule W, manufactured by Bayer Inc.), 333 g of the 1,000 number average molecular weight of polyethylene glycol (manufactured by Maruzen Chemical Co., Ltd.), 22.3 g of dimethylolpropionic acid (trade name: Nikkama PA, manufactured by Nippon Kasei Chemical Co., Ltd.), and 233 g of acetonitrile were put, and then the reaction solution temperature was controlled to be 75 to 78° C. under a nitrogen atmosphere, and then a slight amount of stannous octoate (trade name: Stanoct, manufactured by API corporation) was added thereto as the reaction catalyst, and the reaction was performed in 6 hours until the reaction rate became 99% or more. Next, this was cooled to 40° C. and 17 g of triethylamine was added thereto, and then sufficient stirring and neutralization were performed, and thereby the hydrophilic urethane prepolymer having an isocyanate group at the molecular end was obtained. The hydrophilic urethane prepolymer had 61 weight % of polyoxyethylene group with respect to the hydrophilic urethane prepolymer (solid content).

Synthesis Example 6

Preparation of Hydrophilic Urethane Prepolymer

Based on the following mixing formulation of Table 2, the hydrophilic urethane prepolymer was obtained by the same method as in Synthesis Example 1. The hydrophilic urethane prepolymer had 62 weight % of polyoxyethylene group with respect to the hydrophilic urethane prepolymer (solid content).

TABLE 2

| Formulation (Hydrophilic Urethane Prepolymer) | | Synthesis Example 5 | Synthesis Example 6 |
|---|---|---|---|
| Polyisocyanate | H12MDI | 170 | 170 |
| Hydrophilic Macropolyol | PEG1000 | 333 | 333 |
| Internal Emulsifier | DMPA | 22.3 | 22.3 |
| Solvent | Acetonitrile | 233 | 233 |
| Neutralizing Agent | TEA | 17 | — |
| | DMEA | — | 15 |
| Content of Polyoxyethylene Group (% by weight) | | 61 | 62 |

The abbreviations and the product names in Table 2 are as follows. Moreover, the formulation in Table 2 is shown by g (gram).

PEG1000: 1,000 number average molecular weight of polyethylene glycol, manufactured by Maruzen Chemical Co., Ltd.)

DMEA: Dimethylethanolamine

Synthesis Example 7

Preparation of Aqueous Polyurethane Resin

Here, 350 g of water was added to a reaction container having a homodisper enabling high-speed stirring and the temperature was controlled to be 25° C., and while stirring and mixture were performed at 2,000 (1/min), 205 g of the hydrophobic urethane prepolymer obtained in Synthesis Example 1 whose temperature was cooled preliminarily to 30° C. was added thereto and aqueously dispersed. Next, 5.2 g of isophoronediamine (manufactured by Degussa-Huls Inc.) (corresponding to a 0.80 equivalent ratio with respect to isocyanate group at the end of the hydrophobic urethane prepolymer of Synthesis Example 1) and 1.1 g of polyamine having a polyoxyethylene group (JEFFERMIN EDR-148, manufactured by Huntsman Inc.) were added thereto and stirred for 3 hours. Then, acetonitrile and water were partially removed under reduced pressure. Thus, the aqueous polyurethane resin was prepared.

Synthesis Examples 8 to 10

Preparation of Aqueous Polyurethane Resin

Based on the following mixing formulation of Table 3, the aqueous polyurethane resin was prepared by the same method as in Synthesis Example 7.

TABLE 3

| Formulation (Aqueous Polyurethane Resin) | | Synthesis Example 7 | Synthesis Example 8 | Synthesis Example 9 | Synthesis Example 10 |
|---|---|---|---|---|---|
| Urethane Prepolymer | Kind | Synthesis Example 1 | Synthesis Example 2 | Synthesis Example 5 | Synthesis Example 5 |
| | Amount | 205 | 205 | 206 | 174 |
| Chain extender | IPDA | 5.2 | 5.2 | — | — |
| | EDR148 | 1.1 | 1.1 | 5.9 | — |
| | PEG#1000 Diamine (20% aqueous solution) | — | — | — | 134 |
| | KBM602 | — | — | — | 1.4 |
| Water | | 350 | 350 | 350 | 350 |

The abbreviations and the product names in Table 3 are as follows. Moreover, the formulation in Table 3 is shown by g (gram).

IPDA: isophoronediamine, manufactured by Degussa-Huls Inc.

EDR148: 148 molecular weight of polyoxyalkylene diamine, JEFFERMIN EDR-148 (trade name), manufactured by Huntsman Inc.

PEG#1000 diamine: 1,000 number average molecular weight of polyoxyethylene diamine, manufactured by NOF CORPORATION.

KBM602: N-β(amino ethyl)γ-aminopropylmethyl dimethoxy silane (the amine value is 544), manufactured by Shin-Etsu Chemical Co., Ltd.

Example 1

Preparation of Aqueous Polyurethane Resin

Here, 750 g of water was added to a reaction container having a homodisper enabling high-speed stirring and the temperature was controlled to be 25° C., and while stirring and mixture were performed at 2,000 (1/min), 205 g of the hydrophobic urethane prepolymer obtained in Synthesis Example 1 whose temperature was cooled preliminarily to 30° C. was added thereto and aqueously dispersed. Next, 5.2 g (corresponding to a 0.80 equivalent ratio with respect to isocyanate group at the end of the hydrophobic urethane prepolymer of Synthesis Example 1) of isophoronediamine (manufactured by Degussa-Huls Inc.) was added thereto and agitated for 3 hours.

Then, 205 g of the hydrophilic urethane prepolymer obtained in Synthesis Example 5 whose temperature was cooled preliminarily to 30° C. was added and mixed thereto, and then 7.0 g of polyamine having a polyoxyethylene group (JEFFERMIN EDR-148, manufactured by Huntsman Inc.) was added thereto, and agitated and mixed for 3 hours. Then, acetonitrile and water were partially removed under reduced pressure. Thus, the aqueous polyurethane resin of a 30% solid content was prepared.

Examples 2 to 7

Preparation of Aqueous Polyurethane Resin

Based on the formulation as shown in Table 4, the aqueous polyurethane resin was prepared by the same operation as in the Example 1.

Example 8

Preparation of Aqueous Polyurethane Resin

Based on the formulation as shown in Table 4, the aqueous polyurethane resin was prepared by the same operation as in the Example 1. The stirring and mixture for 3 hours were performed while being heated to 45° C.

TABLE 4

| Formulation (Aqueous Polyurethane Resin) | | Example 1 | Example 2 | Example 3 | Example 4 | Example 5 | Example 6 | Example 7 | Example 8 |
|---|---|---|---|---|---|---|---|---|---|
| Hydrophobic Urethane Prepolymer | Kind | Synthesis Example 1 | Synthesis Example 1 | Synthesis Example 1 | Synthesis Example 2 | Synthesis Example 2 | Synthesis Example 3 | Synthesis Example 4 | Synthesis Example 1 |
| | Amount | 205 | 205 | 206 | 205 | 137 | 205 | 205 | 205 |
| Chain extender | IPDA | 5.2 | 5.2 | — | 5.2 | 3.5 | 5.9 | 5.2 | 5.3 |
| | EDR148 | — | — | 2.9 | — | — | — | — | — |
| | Amino Alcohol EA | — | — | — | — | — | — | — | 1.2 |
| | Equivalent Ratio of Chain extender (vs. NCO Group in Hydrophobic Urethane Prepolymer | 0.80 | 0.80 | 0.50 | 0.80 | 0.80 | 0.85 | 0.80 | 1.20 |

TABLE 4-continued

| Formulation (Aqueous Polyurethane Resin) | | Example 1 | Example 2 | Example 3 | Example 4 | Example 5 | Example 6 | Example 7 | Example 8 |
|---|---|---|---|---|---|---|---|---|---|
| Water | | 750 | 750 | 750 | 750 | 750 | 750 | 750 | 750 |
| Hydrophilic Urethane Prepolymer | Kind | Synthesis Example 5 | Synthesis Example 5 | Synthesis Example 5 | Synthesis Example 5 | Synthesis Example 5 | Synthesis Example 6 | Synthesis Example 5 | Synthesis Example 5 |
| | Amount | 205 | 174 | 205 | 174 | 232 | 205 | 205 | 181 |
| Chain extender | EDR148 | 7.0 | 1.1 | 7.0 | 1.1 | 0.8 | 5.0 | 7.0 | — |
| | PEG#1000 Diamine (20% aqueous solution) | — | 134 | — | 134 | 179 | — | — | 105 |
| | KBM602 | — | 1.4 | 2.5 | 1.4 | 1.8 | 2.5 | — | 1.5 |

The abbreviations and the product names in Table 4 are as follows. Other abbreviations and product names are the same as in the above description. Moreover, the formulation in Table 4 is shown by g (gram).

Amino alcohol EA: N-(2-aminoethyl)ethanol amine (manufactured by Nippon Nyukazai Co., Ltd.)

Comparative Example 1

Preparation of Aqueous Polyurethane Resin

Here, 50 g of the aqueous polyurethane resin of Synthesis Example 7 and 50 g of the aqueous polyurethane resin of Synthesis Example 9 were mixed and stirred, and the aqueous polyurethane resin was prepared.

Comparative Examples 2 and 3

Based on the following mixing formulation of Table 6, the aqueous polyurethane resin was prepared by the same method as in Comparative Example 1.

TABLE 6

| Physical Properties (Aqueous Polyurethane Resin) | | Comparative Example 1 | Comparative Example 2 | Comparative Example 3 |
|---|---|---|---|---|
| Aqueous Polyurethane Resin | Kind | Synthesis Example 7 Synthesis Example 9 | Synthesis Example 7 Synthesis Example 10 | Synthesis Example 8 Synthesis Example 10 |
| | Amount | 50/50 | 50/50 | 50/50 |
| Content of Polyoxyethylene group (% by weight) | | 31 | 34 | 34 |
| Aspect of Aqueous Polyurethane Resin | Solid Content (% by weight) | 30 | 30 | 30 |
| | Viscosity (mPa·sec) | 17,000 | 20,000 | — |
| Particle Diameter (nm) | | 150 | 150 | — |
| Storage Stability | One Weak | ○ | x | x |
| | One Month | x | x | x |
| | Three Months | x | x | x |
| Water Swelling Rate (%) | | 20 | 22 | 20 |
| Moisture-Permeability Test A-1 Method (20 μm) | Moisture-Permeability (g/m²·24 hours) | 5,100 | 6,100 | 4,800 |

TABLE 5

| Physical Properties (Aqueous Urethane Resin) | | Example 1 | Example 2 | Example 3 | Example 4 | Example 5 | Example 6 | Example 7 | Example 8 |
|---|---|---|---|---|---|---|---|---|---|
| Content of Polyoxyethylene group (% by weight) | | 31 | 34 | 33 | 34 | 45 | 31 | 31 | 33 |
| Aspect of Aqueous Polyurethane Resin | Solid Content (% by weight) | 30 | 30 | 30 | 30 | 30 | 30 | 30 | 28 |
| | Viscosity (mPa·sec) | 30,000 | 27,000 | 50,000 | 46,000 | 23,000 | 18,000 | 21,000 | 35,000 |
| Particle Diameter (nm) | | 500 | 1,700 | 600 | 1,200 | 850 | 300 | 350 | 350 |
| Storage Stability | One Weak | ○ | ○ | ○ | ○ | ○ | ○ | ○ | ○ |
| | One Month | ○ | ○ | ○ | ○ | ○ | ○ | ○ | ○ |
| | Three Months | ○ | ○ | ○ | ○ | ○ | ○ | ○ | ○ |
| Water Swelling Rate (%) | | 20 | 22 | 22 | 20 | 28 | 24 | 18 | 24 |
| Moisture-Permeability Test A-1 Method (20 μm) | Moisture-Permeability (g/m²·24 hours) | 5,100 | 5,900 | 4,900 | 4,800 | 6,600 | 5,400 | 4,800 | 5,600 |
| Mechanical Strength | Tensile Strength (MPa) | 6.3 | 7.5 | 7.2 | 8.2 | 4.2 | 5.2 | 5.2 | 8.2 |
| | Extension Percentage (%) | 520 | 480 | 560 | 350 | 450 | 540 | 460 | 490 |

TABLE 6-continued

| Physical Properties (Aqueous Polyurethane Resin) | | Comparative Example 1 | Comparative Example 2 | Comparative Example 3 |
|---|---|---|---|---|
| Mechanical Strength | Tensile Strength (MPa) | 6.1 | 6.7 | 7.7 |
| | Extension Percentage (%) | 500 | 480 | 370 |

(Evaluation)

(1) Test of Water Swelling Property

The aqueous polyurethane resin of each of Examples and Comparative Examples was cast, and a dried clear capsule having a film thickness of 0.1 mm was formed. Then this capsule was cut into 10 cm×10 cm to be a sample.

In casting, the aqueous polyurethane resin was applied onto a surface of an exfoliate paper by using a knife coater and subjected to heat treatment at 130° C. for 5 min, and thereby the clear capsule was obtained. When viscosity of the aqueous polyurethane resin was 20,000 mPa·sec or more, water was added thereto and sufficiently agitated and the viscosity was controlled so that the viscosity became 5,000 to 20,000 mPa·sec, and after still leaving for one day, casting was performed.

Each of the obtained samples was immersed in 25° C. distilled water for 3 hours, and immediately after taken out, lengths of sides of the square were measured, and the average of the lengths of sides of the square was employed as the water swelling rate (incidentally, the water swelling rate of 100% represents that both of the lengths of sides increase twice). The results are shown in Table 5 and Table 6.

(2) Measurement of Film Strength

By the same operation as the test of water swelling property, the capsule cut into 6 cm×1 cm was used as a sample. The sample was pulled at a cross head speed of 300 mm/min, and the strength was measured. The results are shown in Table 5 and Table 6.

(3) Moisture-Permeability Test A Method

The aqueous polyurethane resin of each of Examples and Comparative Examples was cast, and a dried clear capsule having a film thickness of 0.02 mm was formed. Then, the moisture-permeability of this capsule was evaluated according to JIS L1099-A1 method. The results were shown in Table 5 and Table 6.

(4) Storage Stability

The aqueous polyurethane resin of each of Examples and Comparative Examples was put in a clear bottle and maintained in the state of 25° C. The fluidity and appearance of the aqueous polyurethane resin were confirmed visually. The results are shown in Table 5 and Table 6. In the Tables, "O" represents the state of good fluidity, and "X" represents the state that the fluidity is defective and that gelatinization is caused or the aqueous polyurethane resin is separated.

(5) Measurement of Particle Diameter

The particle diameter of the aqueous polyurethane resin of each of Examples and Comparative Examples was measured by an apparatus for measuring a particle diameter (N4 Plus Submicron Particle Sizer, manufactured by COULTER Inc.) The results were shown in Table 5 and Table 6.

It is clear from Table 5 and Table 6 that the aqueous polyurethane resins obtained in Examples 1 to 8 have better storage stability than those of the aqueous polyurethane resins obtained in Comparative Examples 1 to 3.

The above-described inventions have been provided as embodiments of examples of the present invention. However, the inventions are mere examples and must not be interpreted in a limited way. The modifications of the present invention which are obvious to a person having ordinary skill in the art are included in the scope of Claims to be described later.

INDUSTRIAL APPLICABILITY

The aqueous polyurethane resin of the preset invention is used not only for the film application or the processing application as the moisture-permeable and water-proof raw material for clothing, but also for various applications such as automobile, electronics, building material, and artificial leather.

Moreover, the method for producing an aqueous polyurethane resin of the present invention is used for producing an aqueous polyurethane resin in which a stable aqueous form is formed and the balance between hydrophilicity and hydrophobicity is controlled.

Moreover, the film of the present invention is used for the film application or the processing application as the moisture-permeable and water-proof raw material for clothing.

What is claimed is:

1. An aqueous polyurethane resin comprising a plurality of polyurethane resins obtained by reacting macropolyol, an alicyclic diisocyanate, a compound having an active hydrogen group having an anionic group, and a chain extender, wherein each of the polyurethane resins contains the macropolyol which is different from one another, and each of the polyurethane resins is chemically bonded partially to one another through the chain extender, wherein at least one polyurethane resin out of the plurality of polyurethane resins contains at least one kind of hydrophobic macropolyol selected from the group consisting of polyesterpolyol, polycarbonatepolyol, and polyoxypolyalkylenepolyol whose alkylene group has 3-10 carbons, and in the plurality of polyurethane resins, the polyurethane resin which is different from the polyurethane resin containing the hydrophobic macropolyol has a hydrophilic macropolyol having 50% by weight or more of polyoxyethylene groups, and wherein the chain extender comprises a hydrophobic chain extender and a hydrophilic chain extender.

2. The aqueous polyurethane resin according to claim 1, wherein a chemical bond is an urea bond.

3. The aqueous polyurethane resin according to claim 2, wherein the chain extender contains polyamine, and the urea bond is a urea bond produced by reaction of the polyamine and the alicyclic diisocyanate.

4. The aqueous polyurethane resin according to claim 1, wherein the polyoxyethylene groups contained in the aqueous polyurethane resin is 20% by weight or more.

5. The aqueous polyurethane resin according to claim 1, wherein the hydrophobic macropolyol is contained at 40% by weight or more with respect to the polyurethane resin containing the hydrophobic macropolyol, and the polyoxyethylene group in the hydrophilic macropolyol is contained at 40% by weight or more with respect to the polyurethane resin containing the hydrophilic macropolyol.

6. The aqueous polyurethane resin according to claim 1, wherein the hydrophilic chain extender contains polyamine having a polyoxyethylene group.

7. The aqueous polyurethane resin according to claim 1, wherein the hydrophilic chain extender contains an alkoxysilyl compound having a primary amino group or having a primary amino group and a secondary amino group.

8. The aqueous polyurethane resin according to claim 1, wherein the hydrophobic chain extender contains a diamine.

9. A method for producing an aqueous polyurethane resin, comprising the steps of:
   reacting a first macropolyol, an alicyclic dissxocyanate and a compound having an active hydrogen group having an anionic group to obtain a first urethane prepolymer, and aqueously dispersing the first urethane prepolymer;
   partially extending an isocyanate group at an end of the first urethane prepolymer with a hydrophobic chain extender;
   reacting a second macropolyol, an alicyclic dissxocyanate and a compound having an active hydrogen group having an anionic group to obtain a second urethane prepolymer;
   aqueously dispersing the second urethane prepolymer in an aqueous medium in which the extended first urethane prepolymer is aqueously dispersed; and
   extending, with a hydrophilic chain extender, a residual isocyanate group at an end of the extended first urethane prepolymer and an isocyanate group at an end of the aqueously dispersed second urethane prepolymer,
   wherein the first macropolyol comprises at least one kind of hydrophobic macropolyol selected from the group consisting of polyesterpolyol, polycarbonatepolyol, and polyoxypolyalkylenepolyol whose alkylene group has 3-10 carbons ; and
   the second macropolyol comprises a hydrophilic macropolyol having 50% by weight or more of polyoxyethylene groups.

10. The method for producing an aqueous polyurethane resin according to claim 9, wherein an equivalent ratio of the hydrophobic chain extender for partially extending the isocyanate group at an end of the first urethane prepolymer with respect to the isocyanate group at the end of the first urethane prepolymer is 0.20 to 0.98.

11. The method for producing an aqueous polyurethane resin according to claim 9, wherein in the step of aqueously dispersing the second urethane prepolymer in the aqueous medium in which the extended first urethane prepolymer is aqueously dispersed, the first urethane prepolymer and the second urethane prepolymer does not dissolve into each other.

12. A method for producing an aqueous polyurethane resin, comprising the steps of:
   reacting a first macropolyol, an alicyclic diisocyanate and a compound having an active hydrogen group having an anionic group to obtain a first urethane prepolymer, and aqueously dispersing the first urethane prepolymer;
   extending an isocyanate group at an end of the first urethane prepolymer with a hydrophobic chain extender whose equivalent ratio with respect to the isocyanate group at the end is excessive;
   reacting a second macropolyol, an alicyclic diisocyanate and a compound having an active hydrogen group having an anionic group to obtain a second urethane prepolymer;
   aqueously dispersing the second urethane prepolymer in an aqueous medium in which the extended first urethane prepolymer is aqueously dispersed, and at the same time, the extended first urethane prepolymer and the second urethane prepolymer are extended with the hydrophobic chain extender; and
   extending an isocyanate group at an end of the aqueously dispersed second urethane prepolymer with a hydrophilc chain extender,
   wherein the first macropolyol comprises at least one kind of hydrophobic macropolyol selected from the group consisting of polyesterpolyol, polycarbonatepolyol, and polyoxypolyalkylenepolyol whose alkylene group has 3-10 carbons ; and
   the second macropolyol comprises the hydrophilic macropolyol having 50% by weight or more of polyoxyethylene groups.

13. The method for producing an aqueous polyurethane resin according to claim 12, wherein an equivalent ratio of the excessive hydrophobic chain extender with respect to the isocyanate group at the end of the first urethane prepolymer is 1.02 to 1.80.

14. The method for producing an aqueous polyurethane resin according to claim 12, wherein in the step of aqueously dispersing the second urethane prepolymer in the aqueous medium in which the extended first urethane prepolymer is aqueously dispersed, the first urethane prepolymer and the second urethane prepolymer does not dissolve into each other.

15. A film obtained by casting or coating an aqueous polyurethane resin comprising a plurality of polyurethane resins obtained by reacting macropolyol, an alicyclic diisocyanate, a compound having an active hydrogen group having an anionic group and a chain extender, wherein
   each of the polyurethane resins contains the macropolyol which is different from one another, and each of the polyurethane resins is chemically bonded partially to one another through the chain extender,
   wherein at least one polyurethane resin out of the plurality of polyurethane resins contains at least one kind of hydrophobic macropolyol selected from the group consisting of polyesterpolyol, polycarbonatepolyol, and polyoxypolyalkylenepolyol whose alkylene group has 3-10 carbons, and
   in the plurality of polyurethane resins, the polyurethane resin which is different from the polyurethane resin containing the hydrophobic macropolyol has a hydrophilic macropolyol having 50% by weight or more of polyoxyethylene groups, and
   wherein the chain extender comprises a hydrophobic chain extender and a hydrophilic chain extender.

* * * * *